(12) United States Patent
Chen et al.

(10) Patent No.: US 8,982,973 B2
(45) Date of Patent: Mar. 17, 2015

(54) CORRELATION-MATRIX FEEDBACK METHOD AND SYSTEM FOR ANTENNA ARRAY

(75) Inventors: Jinhui Chen, Shanghai (CN); Dong Li, Shanghai (CN); Hongwei Yang, Shanghai (CN); Yang Song, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/639,140

(22) PCT Filed: Apr. 6, 2010

(86) PCT No.: PCT/CN2010/000447
§ 371 (c)(1),
(2), (4) Date: Oct. 3, 2012

(87) PCT Pub. No.: WO2011/123977
PCT Pub. Date: Oct. 13, 2011

(65) Prior Publication Data
US 2013/0022139 A1    Jan. 24, 2013

(51) Int. Cl.
*H04K 1/10*   (2006.01)
*H04L 27/28*  (2006.01)
*H04B 7/06*   (2006.01)

(52) U.S. Cl.
CPC ............ *H04B 7/0639* (2013.01); *H04B 7/0663* (2013.01)
USPC ........................................................ 375/260

(58) Field of Classification Search
USPC ................................................ 375/259, 260
See application file for complete search history.

(56) References Cited

U.S. PATENT DOCUMENTS

2005/0286663 A1  12/2005  Poon
2008/0080634 A1   4/2008  Kotecha et al.
(Continued)

FOREIGN PATENT DOCUMENTS

CN      1973473 A      5/2007
CN    101166052 A      4/2008
(Continued)

OTHER PUBLICATIONS

International Search Report for PCT/CN2010/000447 dated Jan. 20, 2011.
(Continued)

*Primary Examiner* — Tanmay Shah
(74) *Attorney, Agent, or Firm* — Fay Sharpe LLP

(57) ABSTRACT

The present invention provides a correlation-matrix feedback method and system for an antenna array. The method comprises steps of: selecting, at a receiving end, a codeword from a predetermined correlation-matrix codebook comprising a plurality of codewords according to a predetermined criterion to represent a correlation matrix to be fed back (300); and feeding back an index of the selected codeword in the predetermined correlation-matrix codebook to a transmitting end (302); wherein each codeword is a codeword matrix for approximating a correlation matrix of an antenna array at the transmitting end. According to the present invention, it is possible to take good advantage of the characteristics of closely-spaced ULA antennas and spatial correlation thereof, design a corresponding codebook for quantization and feedback, and reduce feedback overhead and computational complexity so as to improve the system performance of a spatial correlation aided system, such as a MIMO system.

18 Claims, 2 Drawing Sheets

(56) References Cited

U.S. PATENT DOCUMENTS

| | | |
|---|---|---|
| 2008/0095258 A1 | 4/2008 | She et al. |
| 2009/0041150 A1* | 2/2009 | Tsai et al. .................. 375/267 |
| 2010/0232525 A1* | 9/2010 | Xia et al. .................. 375/259 |

FOREIGN PATENT DOCUMENTS

| | | |
|---|---|---|
| CN | 101510820 A | 8/2009 |
| WO | 2008133580 A1 | 11/2008 |
| WO | 2009002269 A1 | 12/2008 |

OTHER PUBLICATIONS

English Bibliography for Chinese Pat. App. Publication No. CN 101510820A, Published Aug. 19, 2009, Printed From Thomson Innovation on Oct. 16, 2014, 3 Pages.

\* cited by examiner

CORRELATION-MATRIX FEEDBACK METHOD AND SYSTEM FOR ANTENNA ARRAY

FIELD OF THE INVENTION

Embodiments of the present invention relate to the field of communication technology, and particularly to a correlation-matrix feedback method and system for an antenna array.

BACKGROUND OF THE INVENTION

It is well known that in an MIMO system, knowing the spatial correlation matrix of transmit antennas at a transmitting end can significantly improve system performance. In practice, the correlation matrix cannot be known in advance. For instance, for a Frequency-Division Duplex (FDD) system, it is necessary to let the transmitting end know the approximation of the correlation matrix via quantization and feedback. Hence, the feedback overhead and quantization precision are main concerns for correlation matrix feedback in a MIMO system.

In discussions of LTE-A, it is proposed to feed back multiple eigenvectors quantized with multiple Discrete Fourier Transform (DFT) vector codebooks and the corresponding eigenvalues quantized with a uniform scalar codebook, and to reconstruct the correlation matrix at the transmitting end with the quantized eigenvectors and eigenvalues. Marwell proposed to feedback two or four real scalars quantized with a uniform scalar codebook and to reconstruct the correlation matrix at the transmitting end with the quantized scalars. These feedback solutions based on eigenvectors and based on scalars have not yet used the matrix structure of the spatial correlation matrix and a special antenna configuration, for example, uniform linear array (ULA) antennas, and thus the amount of data to be fed back is still large, which causes a higher feedback overhead.

Currently, for use of closely-spaced ULA antennas as a typical antenna configuration, there has not been provided a corresponding correlation-matrix feedback method. Since the spacing between two antennas in the closely-spaced ULA antennas is very small, the correlation matrix thereof is characterized in that all diagonal entries are 1. For this special antenna configuration, there is a need to design a corresponding correlation matrix feedback method and a codebook for the quantization and feedback of the correlation matrix so as to achieve excellent system performance with a smaller feedback overhead and lower complexity.

SUMMARY OF THE INVENTION

In view of the above problems, the present invention provides a correlation-matrix feedback method for an antenna array, comprising steps of:

selecting, at a receiving end, a codeword from a predetermined correlation-matrix codebook comprising a plurality of codewords according to a predetermined criterion to represent a correlation matrix to be fed back; and feeding back an index of the selected codeword in the predetermined correlation-matrix codebook to a transmitting end;

wherein each codeword is a codeword matrix for approximating a correlation matrix of an antenna array at the transmitting end.

According to a preferred embodiment of the present invention, the antenna array comprises closely-spaced uniform linear array (ULA) antennas, According to a preferred embodiment of the present invention, each codeword matrix is an exponential correlation matrix for approximating the correlation matrix, and an $(i,j)^{th}$ entry $\rho_{ij}$ in the exponential correlation matrix is $\rho_{ij} = r^{|i-j|} e^{j(i-j)\theta}$, wherein e represents a natural number, i and j are integers greater than 0 and not greater than N or integers not less than 0 and not greater than N−1, N represents the number of antennas in the antenna array at the transmitting end, and r and θ are random variables with positive real values and being independent of each other.

According to a preferred embodiment of the present invention, each of r and θ has a codebook corresponding to its distribution, wherein θ is evenly distributed in an interval (0,2π], and r is greater than 0.5 and smaller than 1.

According to a preferred embodiment of the present invention, each codeword matrix is obtained by a calculation based on $\rho_{ij} = r^{|i-j|} e^{j(i-j)\theta}$ using the codebooks of r and θ.

According to a preferred embodiment of the present invention, the predetermined criterion comprises a matrix collinear criterion, and the step of selecting a codeword comprises: calculating colinearity between each codeword matrix in the predetermined correlation-matrix codebook and the correlation matrix to be fed back, and selecting a codeword matrix with maximum colinearity to represent the correlation matrix to be fed back.

According to a preferred embodiment of the present invention, the method further comprises: after receiving the codeword index fed back from the receiving end, obtaining, at the transmitting end, a corresponding codeword from the predetermined correlation-matrix codebook by using the index so as to acquire an approximation of the correlation matrix.

According to a preferred embodiment of the present invention, the receiving end comprises a user equipment and the transmitting end comprises a base station.

The present invention further provides a correlation-matrix feedback system for an antenna array, comprising:

a selecting device located at a receiving end and configured to select a codeword from a predetermined correlation-matrix codebook comprising a plurality of codewords according to a predetermined criterion to represent a correlation matrix to be fed back; and a feedback device located at the receiving end and configured to feed back to a transmitting end an index of the selected codeword in the predetermined correlation-matrix codebook;

wherein each codeword is a codeword matrix for approximating a correlation matrix of an antenna array at the transmitting end.

According to a preferred embodiment of the present invention, the selecting device calculates colinearity between each codeword matrix in the predetermined correlation-matrix codebook and the correlation matrix to be fed back, and selects a codeword matrix with maximum colinearity to represent the correlation matrix to be fed back.

According to a preferred embodiment of the present invention, the system further comprises: an obtaining device located at the transmitting end and configured to, after the transmitting end having received the codeword index fed back from the receiving end, obtain a corresponding codeword from the predetermined correlation-matrix codebook by using the index, so as to acquire an approximation of the correlation matrix.

As compared with the quantization and feedback methods in the prior art, the correlation-matrix feedback method and system according to the present invention take good advantage of the characteristics of the closely-spaced ULA antennas and spatial correlation thereof, design a corresponding codebook for quantization and feedback, and can reduce feedback overhead and computational complexity so as to improve the system performance of a spatial correlation aided system, such as a MIMO system.

BRIEF DESCRIPTION OF THE DRAWINGS

Preferred embodiments of the present invention will be described with reference to the drawings to make the above and other objectives, features and advantages of the present invention clearer, wherein.

DETAILED DESCRIPTION OF EMBODIMENTS

Figure 1:
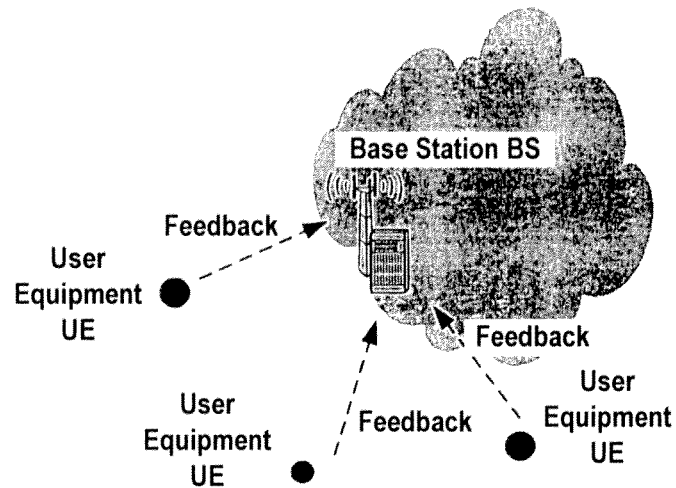
FIG. 1 illustrates an example of the application environment of a preferred embodiment of the present invention and illustratively shows a base station (BS) as the transmitting end and a user equipment (LIB) as the receiving end.

In a spatial correlation aided system, such as a MIMO system, in order to improve system performance, the receiving end needs to feed back a spatial correlation matrix of the relevant antenna array to the transmitting end so that the transmitting end can use the fed back information to obtain the approximation of the correlation matrix and perform desired transmitting operations. For a typical antenna configuration using the closely-spaced ULA antennas, the present invention provides a corresponding correlation-matrix feedback method and system to take good advantage of the characteristics of the ULA antenna configuration, reduce feedback overhead and computational complexity, and improve the system performance of such kind of systems.

With regard to a real channel for the closely-spaced ULA antennas, a normalized spatial correlation matrix, which is normalized by the maximal diagonal entry, can be approximated by an exponential correlation model, in which the (i, j)$^{th}$ entry is in the form of $\rho_{ij}=\rho^{|i-j|}$, where $\rho$ is a real number, values of subscripts i and j are relevant to the number of antennas in the antenna array at the transmitting end, $\rho_{ij}$ represents correlation of the i$^{th}$ antenna and the j$^{th}$ antenna. For example, if the number of antennas at the transmitting end is 4, the values of i and j are integers in a range of 0 to 3 or 1 to 4. All diagonal entries are equal to 1 since the antennas are closely spaced (for details, please refer to the reference document: V. A. Aalo, "Performance of maximal-ratio diversity systems in a correlated Nakagami-fading environment", IEEE Transaction on Communications, Vol. 43, No. 8, August 1995.) Further considering a complex channel, inventors of the present application note that this normalization model can be extended to a complex exponential correlation model, in which the (i, j)$^{th}$ entry is in the form of $\rho_{ij}=r^{|i-j|}e^{j(i-j)\theta}$, where values of subscripts i and j are relevant to the number of antennas in the antenna array at the transmitting end, and $\rho_{ij}$ represents correlation of the i$^{th}$ antenna and the j$^{th}$ antenna. Likewise, since the antennas are closely spaced, r is a positive real number smaller than 1 and greater than 0.5 and θ can be evenly distributed in an interval (0,2π]. r and θ can be regarded as two random variables with positive real values and being independent of each other.

Furthermore, the inventors of the present application also note that two codebooks corresponding to the distributions of r and θ respectively can be designed, and a correlation-matrix codebook can be produced by combining the codebooks of r and θ, and the correlation-matrix codebook is pre-stored in the receiving end an the transmitting end. For example, first according to the system configuration and performance requirements, the codebooks of r and θ can be set to e.g., $A_r$ and $A_\theta$ which respectively reflect the distributions of r and θ, wherein $A_r=\{a, b, \ldots, h\}$, $A_\theta=\{n\pi/m | n=0, \ldots, m-1\}$, a, b, . . . , h are all positive real numbers smaller than 1 and greater than 0.5, m is an integer greater than 0, typically being power of 2, and n is an integer not greater than m−1. Subsequently, the matrices of r and θ for certain values are obtained according to the number of antennas in the antenna array at the transmitting end and the formula $\rho_{ij}=r^{|i-j|}e^{j(i-j)\theta}$. For example, the corresponding matrices are obtained for r=a and θ=π/m, where the dimensions of these matrices are the same as the number of antennas in the antenna array at the transmitting end, i.e., the same as the dimension of the correlation matrix to be fed back. In this manner, all entries in the codebooks $A_r$ and $A_\theta$ are used to obtain a plurality of matrices and these matrices are in turn regarded as codewords to construct the correlation matrix codebook for quantization and feedback of the correlation matrix. According to the above design manner, the final correlation matrix codebook contains a plurality of codewords, wherein each codeword is a codeword matrix for approximating the correlation matrix of the antenna array at the transmitting end, for example, the exponential correlation matrix as stated above.

As such, the correlation-matrix feedback system and method according to the present invention can feed back indices of the matrix-type codewords for approximating or quantizing the correlation matrix, and the transmitting end can directly obtain the approximated or quantized matrix of the correlation matrix according to the indices, without reconstructing the correlation matrix at the transmitting end according to the quantized eigenvectors, eigenvalues or scalars as in the existing methods. Therefore, the correlation-matrix feedback system and method according to the present invention can reduce the computational complexity.

Examples of the codebooks $A_r$ and $A_\theta$ and examples of the finally-obtained correlation-matrix codebook are presented hereunder in the description.

Hereafter, the correlation-matrix feedback system and method for an antenna array according to the present invention are described with reference to FIGS. 1-3, wherein the correlation-matrix codebooks designed as above are used for quantization and feedback of the correlation matrix.

FIG. 1 illustrates an example of the application environment of a preferred embodiment of the present invention and schematically shows a base station (BS) as the transmitting end and a user equipment (UE) as the receiving end. Here, a correlation aided MU-MIMO (Multi-User Multiple-Input Multiple-Output) system can be considered, wherein the base station can be an enhanced base station eNB in the wireless communication application environment of 3GPP LTE, which has an antenna configuration with the closely-spaced ULA antennas. Those skilled in the art can appreciate that the system and method of the present invention can be applied to any other suitable communication systems or environments, and the transmitting end and receiving end can also be any other suitable apparatuses or devices. In the following description, details and functions unnecessary for the present invention and details and functions well known by those skilled in the art are omitted to prevent confusion in understanding of the present invention.

The correlation matrix codebook is pre-stored in the base station BS and the user equipments UEs. The user equipment UE selects a codeword from the correlation-matrix codebook according to a predetermined criterion to represent the correlation matrix to be fed back, and feeds back the index of the selected codeword in the predetermined correlation-matrix codebook to the base station BS, wherein the index can be a value indicative of which codeword the selected codeword is. Besides, the predetermined criterion can be a matrix collinear criterion, where the user equipment UE calculates colinearity between each codeword matrix in the correlation-matrix codebook and the correlation matrix to be fed back, and selects a codeword matrix with maximum colinearity to represent the correlation matrix to be fed back. The base station BS, after receiving the codeword index fed back from the receiving end, uses the index to obtain a corresponding codeword from the pre-stored correlation-matrix codebook, so as to acquire the approximation of the correlation matrix.

Figure 2:
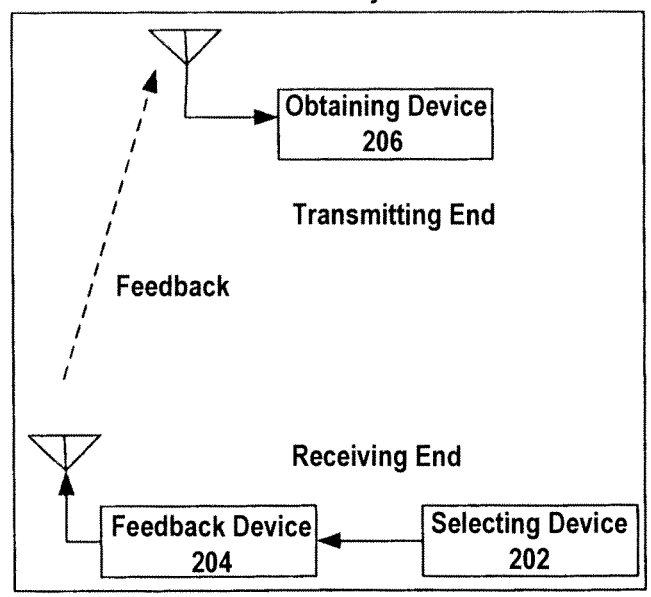
FIG. 2 illustrates a structural block diagram of a correlation-matrix feedback system according to a preferred embodiment of the present invention.

FIG. 2 illustrates a structural block diagram of a correlation-matrix feedback system according to a preferred embodiment of the present invention. As shown in the figure, the correlation-matrix feedback system 20 comprises a selecting device 202 located at the user equipment UE (namely, the receiving end) and configured to select a codeword from a predetermined correlation-matrix codebook comprising a plurality of codewords according to a predetermined criterion to represent the correlation matrix to be fed back; and a feedback device 204 located at the user equipment UE (namely, the receiving end) and configured to feed back to the base station BS (namely, the transmitting end) the index of the selected codeword in the predetermined correlation-matrix codebook. The correlation-matrix feedback system 20 can further comprise an obtaining device 206 located at the base station BS (namely, the transmitting end) and configured to, after the base station BS receiving the codeword index fed back from the user equipment UE, use the index to obtain a corresponding codeword from the predetermined correlation-matrix codebook, so as to acquire the approximation of the correlation matrix.

The predetermined correlation-matrix codebook is a correlation-matrix codebook designed and constructed as above. Hereunder, two examples of the correlation-matrix codebook are described with respect to the closely-spaced ULA antenna configuration with four transmitting antennas, wherein a complex exponential correlation model and a computation formula $\rho_{ij} = r^{|i-j|} e^{j(i-j)\theta}$ are used.

Example 1

| $A_r = \{0.6, 0.8\}, A_\theta = \{n\pi/4 \mid n = 0, \ldots, 7\}$ | |
|---|---|
| Index | Codeword |
| n = 0, ..., 7 | $R_n = \begin{bmatrix} 1 & 0.6e^{jn\pi/4} & 0.6^2 e^{jn\pi/2} & 0.6^3 e^{j3n\pi/4} \\ 0.6e^{-jn\pi/4} & 1 & 0.6e^{jn\pi/4} & 0.6^2 e^{jn\pi/2} \\ 0.6^2 e^{-jn\pi/2} & 0.6e^{-jn\pi/4} & 1 & 0.6e^{jn\pi/4} \\ 0.6^2 e^{-j3n\pi/4} & 0.6^2 e^{-jn\pi/2} & 0.6e^{-jn\pi/4} & 1 \end{bmatrix}$ |
| n = 8, ..., 15 | $R_n = \begin{bmatrix} 1 & 0.8e^{jm\pi/4} & 0.8^2 e^{jm\pi/2} & 0.8^3 e^{j3m\pi/4} \\ 0.8e^{-jm\pi/4} & 1 & 0.8e^{jm\pi/4} & 0.8^2 e^{jm\pi/2} \\ 0.8^2 e^{-jm\pi/2} & 0.8e^{-jm\pi/4} & 1 & 0.8e^{jm\pi/4} \\ 0.8^2 e^{-j3m\pi/4} & 0.8^2 e^{-jm\pi/2} & 0.8e^{-jm\pi/4} & 1 \end{bmatrix}$ |
| m = n − 8 | |

Here, the number of codewords in the correlation-matrix codebook is a product of the number of elements in the codebook $A_r$ and the number of elements $A_\theta$, namely, 2×8=16. The indices of the codewords are respectively n=0, ..., 7 and n=8, ..., 15, i.e., only four bits are sufficient to feed back the indices of the selected codewords to the transmitting end.

Example 2

| $A_r = \{0.6, 0.8\}, A_\theta = \{n\pi/16 \mid n = 0, \ldots, 31\}$ | |
|---|---|
| Index | Codeword |
| n = 0, ..., 31 | $R_n = \begin{bmatrix} 1 & 0.6e^{jn\pi/16} & 0.6^2 e^{jn\pi/8} & 0.6^3 e^{j3n\pi/16} \\ 0.6e^{-jn\pi/16} & 1 & 0.6e^{jn\pi/16} & 0.6^2 e^{jn\pi/8} \\ 0.6^2 e^{-jn\pi/8} & 0.6e^{-jn\pi/16} & 1 & 0.6e^{jn\pi/16} \\ 0.6^2 e^{-j3n\pi/16} & 0.6^2 e^{-jn\pi/8} & 0.6e^{-jn\pi/16} & 1 \end{bmatrix}$ |
| n = 32, ..., 63 | $R_n = \begin{bmatrix} 1 & 0.8e^{jm\pi/16} & 0.8^2 e^{jm\pi/8} & 0.8^3 e^{j3m\pi/16} \\ 0.8e^{-jm\pi/16} & 1 & 0.8e^{jm\pi/16} & 0.8^2 e^{jm\pi/8} \\ 0.8^2 e^{-jm\pi/8} & 0.8e^{-jm\pi/16} & 1 & 0.8e^{jm\pi/16} \\ 0.8^2 e^{-j3m\pi/16} & 0.8^2 e^{-jm\pi/8} & 0.8e^{-jm\pi/16} & 1 \end{bmatrix}$ |
| m = n − 32 | |

Here, the number of codewords in the correlation-matrix codebook is a product of the number of elements in the codebook $A_r$ and the number of elements in $A_\theta$, namely, 2×32=64. The indices of the codewords are respectively n=0, ..., 31 and n=32, ..., 63 i.e., only six bits are sufficient to feed back the indices of the selected codewords to the transmitting end.

As described above, the system and method of the present invention are only described as examples. The number and values of the elements r and θ in $A_r$ and $A_\theta$ can be set depending on such factors as the system configuration, application requirements and experiences etc., but the present invention is not limited to the above examples.

When the selecting device 202 selects a codeword from the correlation-matrix codebook, it can perform the selection by using a predetermined criterion. In a preferred embodiment of the present invention, a colinearity criterion can be employed to select the codeword having the maximum colinearity with the correlation matrix to be fed back for feedback. The selecting device 202 can calculate the colinearity between each codeword and the correlation matrix according to the formula $$R_k = \mathrm{argmax}_{R_i \in R} \frac{|tr\{R_i^H R\}|}{\|R_i\|_F \|R\|_F},$$

and determine the codeword with the maximum colinearity. In the formula, R is the correlation matrix to be fed back, $R_i$ is the $i^{th}$ codeword in the correlation-matrix codebook R, H represents the operation symbol of Hermitian Transpose, $\| \|F$ represents a Frobenius norm, tr( ) represents a trace of the matrix, argmax( ) represents a parameter enabling the value of the expression in the parentheses to be maximum, $R_k$ is the selected codework for approximating or quantizing the correlation matrix, namely, $\tilde{R}=R_k$. Those skilled in the art can appreciate that in addition to the colinearity criterion, any other suitable criteria can be used to select a codeword. For example, the Euclidian distance criterion can be used to select a codeword with a minimum distance to the correlation matrix for feedback.

After the selecting device 202 selects the codeword for representing the correlation matrix to be fed back (i.e., selects the matrix for approximating and quantizing the correlation matrix to be fed back), the feedback device 204 feeds back the index of the selected codeword in the correlation-matrix codebook to the transmitting end. For example, the selecting device 202 selects the codeword $R_2$ in Example 1 to approximate or quantize the correlation matrix, and the feedback device 204 feeds back a value 2, namely, four bits "0010" to the transmitting end.

After receiving at the transmitting end the codeword index (e.g., "0010") fed back from the user equipment UE, the obtaining device 206 uses the index to obtain a corresponding codeword (e.g., $R_2$) from the correlation-matrix codebook so as to obtain the approximation $\hat{R}=R_2$ of the correlation matrix.

Figure 3:
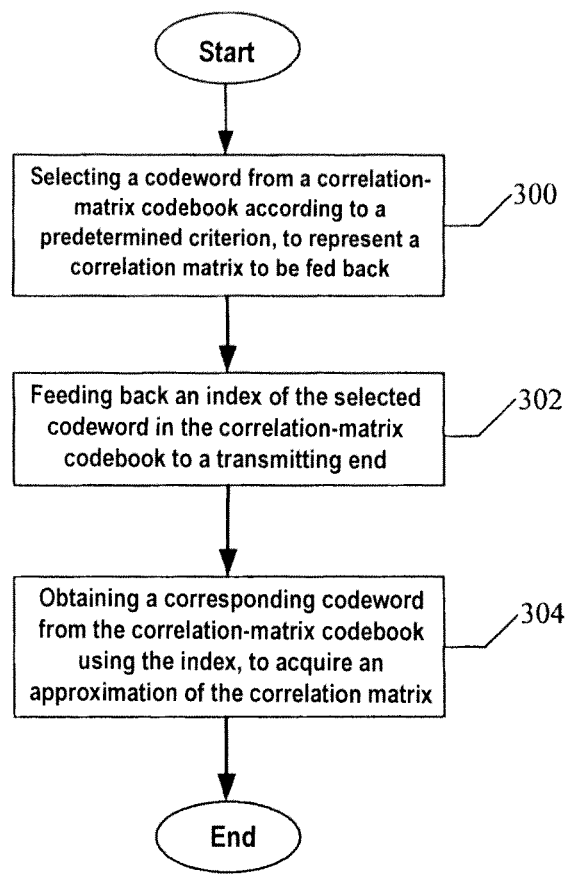
FIG. 3 illustrates a flow chart of a correlation-matrix feedback method according to a preferred embodiment of the present invention.

FIG. 3 illustrates a flow chart of a correlation-matrix feedback method according to a preferred embodiment of the present invention. In combination with the system shown in FIG. 2, at step 300, the selecting device 202 selects a codeword from the correlation-matrix codebook according to a predetermined criterion, to represent the correlation matrix to be fed back. At step 302, the feedback device 204 feeds back the index of the selected codeword in the correlation-matrix codebook to the transmitting end. At step 304, after the transmitting end receives the codeword index fed back from the receiving end, the obtaining device 206 uses the index to obtain a corresponding codeword from the correlation-matrix codebook so as to acquire the approximation of the correlation matrix.

The above describes preferred embodiments of the present invention in detail. As compared with the quantization and feedback methods in the prior art, the correlation-matrix feedback method and system according to the present invention take good advantage of the characteristics of the closely-spaced ULA antennas and spatial correlation thereof, design a corresponding codebook for quantization and feedback, and can reduce feedback overhead and computational complexity so as to improve the system performance of a spatial correlation aided system such as a MIMO system. In order to further embody the advantages of the present invention, simulation data of the correlation-matrix feedback method and system according to the present invention are presented as follows.

The codebook designs in the above Example 1 and Example 2 are applied into the case of a spatial correlation aided MU-MIMO system where the base station BS has 4 half-wavelength spaced ULA antennas and each UE has 2 antennas. The system simulation results are as follows:

|  | Throughput | Cell edge |
| --- | --- | --- |
| Without spatial correlation aid | 3.2502 (100%) | 0.1128 |
| Ideal spatial correlation aid | 3.8517 (118.5%) | 0.1218 |
| Example 1 (feedback 4 bits) | 3.6688 (112.9%) | 0.1147 |
| Example 2 (feedback 6 bits) | 3.7743 (116.1%) | 0.1173 |
| A principal eigenvector with a DFT codebook (feed back 6 bits) | 3.5304 (108.6%) | 0.1125 |
| Two eigenvectors with two DFT codebooks and one scalar codebook (feed back 12 bits) | 3.6831 (113.3%) | 0.1179 |
| Marwell (feed back 8 bits) | 3.7561 (115.6%) | 0.1174 |

Specific parameters for the above simulation environment are as follows:

| Parameters | Assumptions used for simulation environment |
| --- | --- |
| Deployment scenario | 3GPP case 1 3D channel, Spatial Channel Model-Urban Macro (SCM-UMa) Speed: 3 km/h |
| Duplex method and bandwidth | FDD: 10 MHz for downlink |
| Network synchronization | Synchronized |
| Handover margin | 1.0 dB |
| Antenna configuration (base station) | Correlated, co-polarized: 4 transmitting antennas with 0.5 wavelength between two antennas (4 Tx: \|\|\|\|) |
| Antenna configuration (user equipment) | Co-polarized: 2 receiving antennas with 0.5 wavelength separation (2 Rx: \|\|) |
| Downlink transmission scheme | Single-cell Tx correlation-aided MU-MIMO, rank 1 per UE |
| Downlink scheduler | Proportional fair in time and frequency |
| Feedback assumptions | Sub-band Pre-coding Matrix Indicator (PMI), sub-band Channel Quality Indicator (CQI), long-term wideband Tx covariance matrix report PMI/CQI/RI report with 5 ms periodicity, and 6 ms delay Tx correlation matrix report with 100 ms periodicity, and 6 ms delay Sub-band CQI with measurement error: N(0,1 dB) per Physical Resource Block (PRB) |
| Downlink HARQ scheme | Chase combining |
| Downlink receiving end type | MMSE |
| Channel estimation | Ideal |
| Control channel and reference signal overhead | As agreed in ITU assumption with DL CCH of 3OFDM symbols LTE Rel.8: 0.3158 LTE-A: 0.3063 |

It can be seen from the above system simulation results that when the number of feedback bits (namely, feedback overhead) is the same, the correlation-matrix system and method of the present invention can achieve better system performance. Meanwhile, when the system performance is substantially the same, the feedback overhead of the correlation-matrix system and method of the present invention is lower. Meanwhile, the correlation-matrix system and method of the present invention feeds back the index of the matrix-type codeword for approximating and quantizing the correlation matrix, and the transmitting end can directly obtain an approximated or quantized matrix of the correlation matrix according to the index, without reconstructing the correlation matrix at the transmitting end according to the quantized eigenvectors, eigenvalues or scalars as in the existing methods. Therefore, the correlation-matrix feedback system and method according to the present invention can reduce the feedback overhead and computational complexity, thereby improving the system performance.

A plurality of embodiments has been enumerated for respective steps in the above description. Although the inventors have endeavored to indicate the mutually associated instances, it does not mean that these instances must have a correspondence relationship according to corresponding serial numbers. As long as there is no contradiction between given conditions for the selected instances, instances to which the serial numbers do not correspond can be selected in different steps to constitute a corresponding technical solution, and such technical solution should also be regarded as falling within the scope of the present invention.

Those skilled in the art should easily appreciate that different steps of the above method may be utilized through a programming computer. Here, some embodiments likewise comprise machine-readable or computer-readable program storage device (for example, a digital data storage medium) and an encoding-machine-executable or computer-executable program instructions, wherein the instructions execute some or all of the above steps of the methods. The program storage device, for example, may be a digital storage, a magnetic storage medium (such as a magnetic diskette or magnetic tape), hardware, or optically readable digital data storage medium. The embodiments also include a programming computer for performing the above steps of the method.

It should be noted that in the above description, the technical solution of the present invention is only illustrated by means of examples, but it does not mean that the present invention is limited to the above steps and unit structures. In possible scenarios, the steps and unit structures may be adjusted, selected, or discarded as required. Thus, some steps and units are not essential elements necessary for implementing the general inventive concept of the present invention. Thus, the essential technical features of the present invention are merely limited by the minimum requirements capable of implementing the general inventive idea of the present invention, without being limited by the above instances.

By far, the present invention has been described with reference to the preferred embodiments. It should be understood that those skilled in the art may make various kinds of other changes, substitutions and additions without departing from the spirit and scope of the present invention. Thus, the scope of the present invention is not limited to the above specific embodiments, which should be defined by the appended claims.

What is claimed is:

1. A correlation-matrix feedback method for an antenna array, comprising:
   selecting, at a receiving end, a codeword from a predetermined correlation-matrix codebook comprising a plurality of codewords according to a predetermined criterion, to represent a correlation matrix to be fed back; and
   feeding back an index of the selected codeword in the predetermined correlation-matrix codebook to a transmitting end;
   wherein each codeword is a codeword matrix for approximating a correlation matrix of an antenna array at the transmitting end;
   wherein the predetermined criterion comprises a matrix colinear criterion;
   wherein the selecting comprises calculating colinearity between each codeword matrix in the predetermined correlation-matrix codebook and the correlation matrix to be fed back and selecting a codeword matrix with maximum colinearity to represent the correlation matrix to be fed back.

2. The method according to claim 1, wherein the antenna array comprises closely-spaced uniform linear array (ULA) antennas.

3. The method according to claim 2, wherein each codeword matrix is an exponential correlation matrix for approximating the correlation matrix, and the $(i, j)^{th}$ entry $\rho_{ij}$ in the exponential correlation matrix is $\rho_{ij}=r^{|i-j|}e^{j(i-j)\theta}$, wherein e represents a natural number, i and j are integers greater than 0 and not greater than N or integers not less than 0 and not greater than N−1, N represents a number of antennas in the antenna array at the transmitting end, and r and $\theta$ are random variables with positive real values and being independent of each other.

4. The method according to claim 3, wherein each of r and $\theta$ has a codebook corresponding to its distribution.

5. The method according to claim 3, wherein $\theta$ is evenly distributed in an interval $(0, 2\pi]$.

6. The method according to claim 3, wherein r is greater than 0.5 and smaller than 1.

7. The method according to claim 3, wherein each codeword matrix is obtained by a calculation based on $\rho_{ij}=r^{|i-j|}e^{j(i-j)\theta}$ using the codebooks of r and $\theta$.

8. The method according to claim 1, further comprising:
   after receiving the codeword index fed back from the receiving end, obtaining, at the transmitting end, a corresponding codeword from the predetermined correlation-matrix codebook by using the index, so as to acquire an approximation of the correlation matrix.

9. The method according to claim 1, wherein the receiving end comprises a user equipment and the transmitting end comprises a base station.

10. A correlation-matrix feedback system for an antenna array, comprising:
    a selecting device located at a receiving end and configured to select a codeword from a predetermined correlation-matrix codebook comprising a plurality of codewords according to a predetermined criterion, to represent a correlation matrix to be fed back; and
    a feedback device located at the receiving end and configured to feed back to a transmitting end an index of the selected codeword in the predetermined correlation-matrix codebook;
    wherein each codeword is a codeword matrix for approximating a correlation matrix of an antenna array at the transmitting end;
    wherein the predetermined criterion comprises a matrix colinear criterion;
    wherein the selecting device is configured to calculate colinearity between each codeword matrix in the predetermined correlation-matrix codebook and the correlation matrix to be fed back and configured to select a codeword matrix with maximum colinearity to represent the correlation matrix to be fed back.

11. The system according to claim 10, further comprising:
    an obtaining device located at the transmitting end and configured to, after the transmitting end having received the codeword index fed back from the receiving end, obtain a corresponding codeword from the predetermined correlation-matrix codebook by using the index, so as to acquire an approximation of the correlation matrix.

12. The system according to claim 10, wherein the antenna array comprises closely-spaced uniform linear array (ULA) antennas.

13. The system according to claim 12, wherein each codeword matrix is an exponential correlation matrix for approximating the correlation matrix, and the $(i, j)^{th}$ entry $\rho_{ij}$ in the exponential correlation matrix is $\rho_{ij}=r^{|i-j|}e^{j(i-j)\theta}$, wherein e represents a natural number, i and j are integers greater than 0 and not greater than N or integers not less than 0 and not greater than N−1, N represents a number of antennas in the antenna array at the transmitting end, and r and $\theta$ are random variables with positive real values and being independent of each other.

14. The system according to claim 13, wherein each of r and $\theta$ has a codebook corresponding to its distribution.

15. The system according to claim 13, wherein $\theta$ is evenly distributed in an interval $(0, 2\pi]$.

16. The system according to claim 13, wherein r is greater than 0.5 and smaller than 1.

17. The system according to claim 13, wherein each codeword matrix is obtained by a calculation based on $\rho_{ij} = r^{|i-j|} e^{j(i-j)\theta}$ using the codebooks of r and θ.

18. The system according to claim 10, wherein the receiving end comprises a user equipment and the transmitting end comprises a base station.

* * * * *